United States Patent [19]

Donhauser et al.

[11] Patent Number: 4,750,993

[45] Date of Patent: Jun. 14, 1988

[54] PROCESS AND APPARATUS FOR THE SEPARATION OF METALLIC COMPONENTS FROM NONMETALLIC COMPONENTS OF A MIXTURE

[75] Inventors: Friedrich Donhauser; Guido Ropertz, both of Amberg, Fed. Rep. of Germany

[73] Assignee: Amberger Kaolinwerke GmbH, Hirschau, Fed. Rep. of Germany

[21] Appl. No.: 714,544

[22] Filed: Mar. 21, 1985

[30] Foreign Application Priority Data

Mar. 24, 1984 [DE] Fed. Rep. of Germany ....... 3410961

[51] Int. Cl.$^4$ ........................... B03B 7/00; B03B 9/06; B07B 9/00
[52] U.S. Cl. ..................... 209/12; 209/181; 209/44.1; 209/211; 209/443; 209/459; 209/640
[58] Field of Search ...................... 209/2, 12, 18, 44.1, 209/211, 434, 459, 441, 442, 443, 11, 139 R, 466, 640, 631, 637, 1, 3, 13, 17, DIG. 930; 241/20, 79.1, DIG. 38; 29/403.1, 403.3

[56] References Cited

U.S. PATENT DOCUMENTS

| | | | |
|---|---|---|---|
| 1,401,795 | 12/1921 | Kohler et al. | 209/2 X |
| 2,471,043 | 5/1949 | Schenck | 209/12 |
| 2,874,838 | 2/1959 | Pharo | 209/18 |
| 3,105,040 | 9/1963 | Wood | 209/466 |
| 3,323,900 | 6/1967 | Takahashi | 209/12 |
| 3,579,320 | 5/1971 | Pesses | 241/DIG. 38 |
| 3,670,969 | 6/1972 | Terada | 209/403.3 |
| 3,928,182 | 12/1975 | Eder | 209/12 |
| 4,034,861 | 7/1977 | Fontein et al. | 209/211 |
| 4,059,506 | 11/1977 | Bryson | 209/18 |
| 4,155,838 | 3/1979 | Basten et al. | 209/211 X |
| 4,200,486 | 4/1980 | Vagac | 209/12 X |
| 4,505,811 | 3/1985 | Griffiths | 209/17 |
| 4,512,879 | 4/1985 | Attia | 209/3 |
| 4,578,184 | 3/1986 | Rasmussen | 209/3 |

FOREIGN PATENT DOCUMENTS

| | | | |
|---|---|---|---|
| 958673 | 12/1974 | Canada | 209/640 |
| 2139350 | 2/1973 | Fed. Rep. of Germany | |
| 2343345 | 8/1974 | Fed. Rep. of Germany | |
| 2220132 | 2/1975 | Fed. Rep. of Germany | |
| 2539960 | 11/1976 | Fed. Rep. of Germany | |
| 2804548 | 9/1979 | Fed. Rep. of Germany | |
| 2900666 | 6/1980 | Fed. Rep. of Germany | 209/211 |
| 2555093 | 5/1982 | Fed. Rep. of Germany | |
| 1567755 | 5/1969 | France | |
| 2078091 | 12/1971 | France | |
| 2320620 | 4/1977 | France | |
| 83/02281 | 7/1983 | PCT Int'l Appl. | |

OTHER PUBLICATIONS

"Selection and Use of a Hydrocyclone" by Dong Noir Chemical Engineer Magazine, Jan., 1985, pp. 20–27.
*The Humphreys Spiral Concentrator Closed Circuit Test Unit"-Manual of Operating Instructions Bulletin No. 10 (3-3-50).*
"Denver Concentrating Tables" Denver Equipment Co. Bulletin No. T1B3 (5-24-54).
"Recovery and Re-Use of Polymeric Cable Scrap," M. Bevis, et al., Conservation & Recycling, vol. 6, No. ½, pp. 3–10, 1983.

Primary Examiner—Kenneth M. Schor
Assistant Examiner—Thomas M. Lithgow
Attorney, Agent, or Firm—Bacon & Thomas

[57] ABSTRACT

A process and apparatus for separating metallic from nonmetallic components in a mixture are disclosed. The process and apparatus rely upon the combination of prefractionation by sedimentation, preferably centrifugal sedimentation, followed by final concentration in a laminar flow process, preferably employing a spiral separator and one or more vibrating tables, to recover substantially all metal components of the mixture.

14 Claims, 2 Drawing Sheets

PROCESS AND APPARATUS FOR THE SEPARATION OF METALLIC COMPONENTS FROM NONMETALLIC COMPONENTS OF A MIXTURE

BACKGROUND OF THE INVENTION

1. Field of Invention

The invention concerns a process and apparatus for separating metallic from nonmetallic components.

2. Background Information

For reasons of environmental protection and the avoidance of large waste deposits, as well as for the recovery of materials that would otherwise be lost, the recovery of components of waste materials is desirable. Processes for this purpose are already known for waste materials of the electrical industries, in particular electric cables, and the electronic industry in which the cables, equipment, circuit boards, etc. are mechanically comminuted, i.e., shredded, and then separated into metallic and nonmetallic parts by an air screening process. The principal metal obtained thereby is copper, but other metals, such as platinum, gold, palladium, tin and silver are also contained therein, even though in smaller proportions. The disadvantage of this process is the fact that the waste fraction obtained, i.e., essentially the nonmetallic components such as light and heavy synthetic substances and synthetic plastic wastes and textile fibers, still contain approximately 3-15% by weight of unseparated metal and that, furthermore, all of this waste must be deposited in dumps. In the case of certain cable scrap processors the magnitude of such a dump already amounts to 80,000 to 100,000 t. This represents a significant financial burden. In addition, the materials contained in the waste, i.e., both the synthetics and the aforementioned metallic components, cannot be recovered for recycling purposes. This again represents a considerable financial loss.

From DE P No. 25 55 093, the use of a hydrocyclone is known, which in its bottom course precipitates a metal fraction that is as pure as possible. The mode of operation of the process and the apparatus employed are not described. The same is true of DE-AS No. 22 20 132, which relates only to the precipitation of a sinter (iron oxide) from water, in part by gravity sedimentation and in part by centrifugal separation. DE-OS No. 21 39 350 concerns the processing of cable wastes, wherein this mixture is passed into a drum wash and chemically treated therein. Subsequently, the individual components are separated in keeping with their specific gravities by wet mechanical methods. The drying and screening of light materials (paper or the like) by means of hot air is described in DE-OS No. 28 04 548.

SUMMARY OF THE INVENTION

The object of the invention is to recover substantially all of the metallic components contained in the fractions of waste materials of the aforementioned scraping or fine comminution of metallic/nonmetallic mixtures.

In contrast to the aforedescribed state of the art, which provides only sedimentation or only laminar flow separation processes, the invention has demonstrated that the combination of sedimentation for prefractionation with subsequent laminar flow in a two stage process for continued fractionation achieves excellent results in terms of recovering metallic components. In the first stage, i.e., sedimentation, preferably centrifugal sedimentation, presorting of the aggregate or mixture which is highly complex and diverse with respect to specific gravity and particle shape, is attained. Coarser and heavier particles which, however, include residues of lighter particles or fines, are then passed to the second process stage, i.e., the laminar flow stratification process and again fractionated. A concentrate of the metals contained in the mixture is obtained (for example, gold, silver, copper, tin) with a high degree of purity such that the resulting fraction is suitable for economical recovery of individual metallic components by refining or melting. Light materials are recovered from the sedimentation and laminar flow stages and may be further processed for recovery, or discarded by burning or placing in a dump.

In the preferred field of application of the invention two fundamental areas must be distinguished. The first area is so-called cable scrapping, in which the cable consisting of metal cores, typically, copper, and an insulating sheathing, is chopped into small pieces and separated into metallic components and waste by an air screening process. This waste, which still contains 3 to 10% metallic components will be referred to hereafter for the sake of simplicity as "cable scrap". It contains additionally synthetic resins, e.g., polyolefins, polyvinylchloride, as well as rubber or rubber elastic substances and fibrous materials (mainly asbestos or cotton). The synthetic resins, the rubber or the rubber elastic substances and the fiber materials are of interest in terms of recovery and also for the generation of energy by combustion. The polyvinyl chlorides must be further separated as they would release gaseous chlorine in combustion. From this residual fraction subsequently in a further processing step pure polyvinyl chloride is obtained and passed to recycling.

The second fundamental area is the recovery of valuable metal components from so-called electronic waste. This is the waste remaining after the fine comminution and air screening of electronic parts and appliances and after the preliminary separation of metallic components. These electronic parts and appliances may consist of television sets, radio sets, telephone equipment, printed circuits, switch cabinets and the like. A large part of this waste is obtained in the form of filter dust in the course of air screening. For the sake of simplicity, this material is termed hereafter "electronic waste". This electronic waste, similarly to the cable scrap, again cannot be passed directly to refining, i.e., melting, and it has been necessary heretofore to deposit it in a dump. It contains on the average 10 to 15% weight of valuable metals (for example copper, silver, gold and tin). The present invention makes possible the processing of both cable scrap and electronic waste.

It is further an object of the invention to provide a suitable, practical and economical apparatus for conducting the process of the invention. In most general terms, the apparatus comprises the combination of means for providing sedimentation separation with means for providing laminar flow separation connected to the outlet of the sedimentation means.

In particular, for the attainment of the object of the invention the combination of hydrocyclone to provide centrifugal sedimentation with a spiral separator (also referred to as a helical trough separator) and a vibrating table (also referred to as an oscillating table) connected in succession has been found to be advantageous.

Further advantages and characteristics of the invention will become apparent from the remaining description hereafter, with reference to the figures of drawing.

BRIEF DESCRIPTION OF THE FIGURES OF DRAWING

DETAILED DESCRIPTION OF THE PREFERRED EMBODIMENTS

As seen in the description hereinbelow, not all of the components of the process flow sheet depicted in FIG. 1 need to be present or used in the invention. Thus, for achieving laminar flow stratification separation the combination of a spiral separator and a vibrating table is particularly effective and, therefore, the most economical in relation to investment costs. It would be possible, however, to eliminate the spiral separator and install a correspondingly larger and thus more expensive vibrating table. Whether and to what extent the overflow of the sedimentation separation, i.e., the light components of the centrifugal sedimentation from the hydrocyclone and the precipitated lighter components of the laminar flow are processed further and possibly separated, depends both on the material (for example, cable scrap or electronic waste) and the other prevailing conditions of the individual case, and also on the economic decisions of the operator of the installation.

Figure 1:
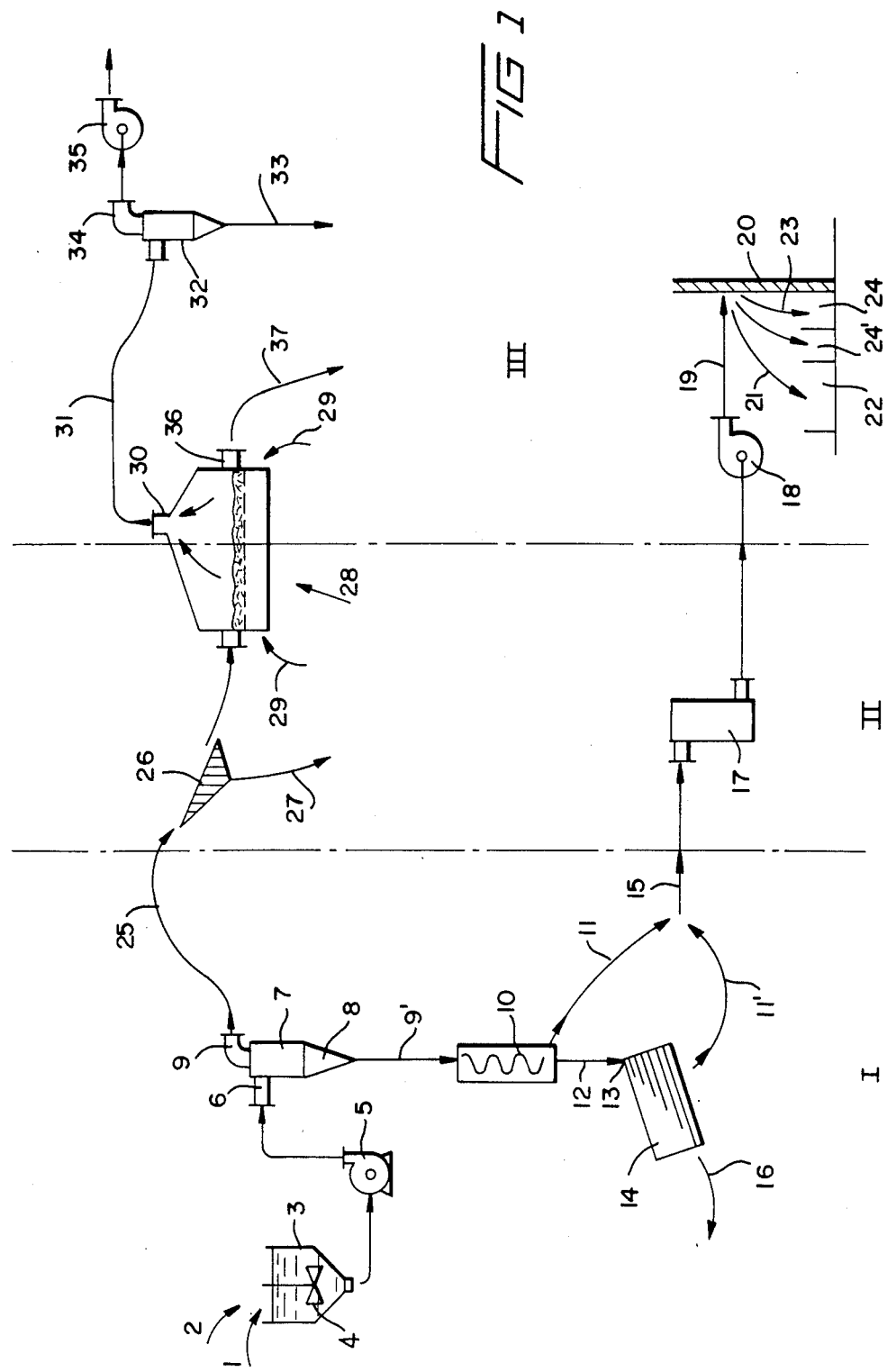
FIG. 1 is a process flow sheet for the invention.

In FIG. 1, three sections, wet preparation I, dehyration II and dry secondary treatment III are shown. In the following, initially section I with the wet preparation shall be examined and only then Sections II and III, in which the treatment of the overflow of the hydrocyclone on the one hand and the treatment of the light components issuing from the laminar flow on the other, will be discussed individually.

The cable scrap or electronic waste is fed, optionally after a preliminary screen, according to 1, together with water 2, into an agitator vessel 3 with an agitator 4. The suspension comprising water and the scrap or waste is passed by means of pump 5 to the inlet 6 of a hydrocyclone 7. The coarser and heavier particles of this suspension exit in the underflow 8 of the hydrocyclone, while the light or finer particles, potentially also those with a diverse particle configuration (foil, fibers, etc.) are precipitated in the overflow of the hydrocyclone 9, which optionally may comprise two stages. In the process, residues of the valuable substances, i.e., the metallic components and heavy synthetic substances, will be entrained in the sludge flow of the hydrocyclone underflow. Even though separation here is not yet effected with the degree of purity desired, the hydrocyclone represents the process stage in which quantitatively the principal separation takes place. While a hydrocyclone is depicted in FIG. 1, it is understood that other sedimentation means, i.e., a sedimentation vessel or centrifuge, could be substituted therefor. In the two main cases of application, concentrations in the hydrocyclone occur as follows:

in the processing of cable scrap the underflow contains polyvinylchloride, rubber or rubber substitutes and metals, while in the overflow polyolefins and fibrous substances are present;

in the second case of the electronic waste the underflow contains an enriched fraction of valuable metals, together with dust residues and the overflow contains essentially only residues of dust and particles of very small shape sizes. In this case the use of flat bottom hydrocyclones is recommend.

The heavy component of the centrifugal sedimentation, in the embodiment depicted in FIG. 1, i.e., the underflow 8 of the hydrocyclone 7, is transported according to 9' to the second process stage, ie., the laminar flow stratification stage. This comprises, in the present embodiment, a spiral separator 10, formed by a stationary spiral or stationary helix contained with a chamber. The spiral separator receives only a small proportion of the volume flow, with respect to the original charge into the hydrocyclone. This relatively strongly concentrated fraction undergoes a secondary treatment in the spiral separator by the laminar flow stratification process. As a result of the strong friction between the sludge running down the wall of the chamber and the helical gutter, the heavier metals are concentrated at the lowest point of the spiral separator, while the lighter substances float in the overflow. The centrifugal force then creates bands running adjacently to each other with their specific gravities decreasing from the inside out. The components are then exhausted separately at the lower end of the spiral of helix. When cable scrap is being processed, these components are the metallic components, rubber and synthetic materials. The light components, i.e., the rubber and the synthetic materials are transported according to 11 for further processing to Sections II and III, while the heavier metallic components concentrated in the spiral separator are passed according to 12 to the inlet 13 of the third process stage in the present embodiment, vibrating table 14.

In the processing of electronic waste, the valuable metal fraction may be concentrated in a spiral separator 10. But it is also possible to pass the underflow fraction of the hydrocyclone directly to the vibrating table if the concentrate in the hydrocyclone is alone adequate. In this manner, the spiral separator is eliminated from the process.

The vibrating table 14 provides the final purification of the metal fraction. Vibrating tables have a plurality of parallel gutters in which the material is contained. The table and thus the gutters are shaken back and forth in their longitudinal direction. In addition, a flow of water is passed over it transversely to the gutters. The lighter components are separated directly by this flow, while the heavier components migrate in the gutters to the lower end of the inclined vibrating table.

To summarize, hydrocyclone 7 effects the separation into lighter components in the overflow and heavy and medium heavy components in the underflow,*) while spiral separator 10 separates the medium heavy components from the heavy metallic components and, finally, on vibrating table 14 a further concentration of the heavy metal components takes place, i.e., the medium heavy components still present in the underflow from the spiral separator. If no spiral separator is present, its function must be assumed by the vibrating table.

*)(The specific weights of the heavy and medium heavy components are higher than the liquid (for example: water), the specific weights of the lightest components "light output fraction" is less the specific weight of the liquid.)

Referring to FIG. 1, output of the vibrating table 14 is divided into medium heavy components according to 11', which are combined with the medium heavy components 11 of the spiral separator according at 15. This stream may comprise a fraction of rubber elastomers and of heavy synthetics or, in individual cases, of a fraction purely of synthetic substances, for example, polyvinylchloride. The other output of the vibrating table is highly concentrated metal fraction 16.

The medium heavy waste 15 may, if necessary, be dehydrated in Section II by dehydration means (evaporator) 17 available for the purpose, and optionally dried. Alternatively, drying may be effected in Section III, for example by a blower 18, which according to 19, blows the mixture of rubber or elastomeric substances and heavier synthetics for separation onto a baffle wall 20. It is preferred to subject the mixture to a thermal pretreatment during the blowing operation to decrease the elasticity of the synthetic resin materials. In keeping with the greater elasticity of rubber and elastomeric substances and the lesser elasticity of the synthetics, the former are thrown according to the arrow 21 into a container 22 and the latter according to the arrows 23 into a container 24, and thereby separated. The aforementioned optional thermal treatment advantageously heats the mixture of material to a temperature at which the synthetic components become softer, i.e., more plastic, thereby decreasing their elasticity in relation to rubber and the elastomeric substances. This facilitates and improves the aforementioned separation via baffle 20 and compartments 22 and 24. It is possible thereby to separate synthetic resin materials, usually polyvinylchlorides which must not be burned, from the combustible rubber or elastomeric substances. Between the containers 22, 24 a further container 24' may be provided to receive a mixed fraction. It is possible to vary the angle of impingement of stream 19 on wall 20, as well as the angle of the nozzle of blower 18 to control the direction of the flow 19 and the rebounding streams 21 and 23.

In the processing of cable scrap, the overflow of the hydrocyclone contains lighter synthetic resin fractions, such as polyolefins and polyethylene and also fibers of all types. These are passed according to 25 to a dehydrating installation 26. The water 27 being discharged may be recycled as process water. The synthetic resin fraction and fibers are then conveyed to a fluid bed dry 28, which dries them to a maximum residual humidity of about 1% by weight. Simultaneously, by means of a directional flow of hot air a screening of the mixed material is effected. The air supply lines are designated 29. The airborne substances containing the entrained fibers exit at 30 and are conducted through the line 31 to a dust cyclone 32. From the underflow of the dust cyclone, the fibers 33 are ejected while the overflow 34 contains air or gases, which are exhausted by a blower 35. The synthetic resin components leave the fluid bed dryer at 36, are discharged according to 37 and passed into a container, not shown. To improve the screening process, the fluid bed dryer may be divided over its length into individual compartments, with the supply of air being optionally more intensive on the inlet side than at the outlet side since on the inlet side the material is still slightly more humid than on the outlet side.

The synthetic resin materials, i.e., polyolefins, obtained may be reused in the production of injection molded parts. The use of the fibers exiting at 33 is optional.

In the processing of electronic waste, as a rule, the light precipitate of the centrifugal sedimentation, i.e., in the subject example the mass discharged at the overflow 9 of the hydrocyclone, represents waste with no further use. Optionally, a dehydration may be performed to remove water, but dry screening is no longer justified. In this case, the only result of interest is the obtainment of the metal concentration at 16.

Figure 2:
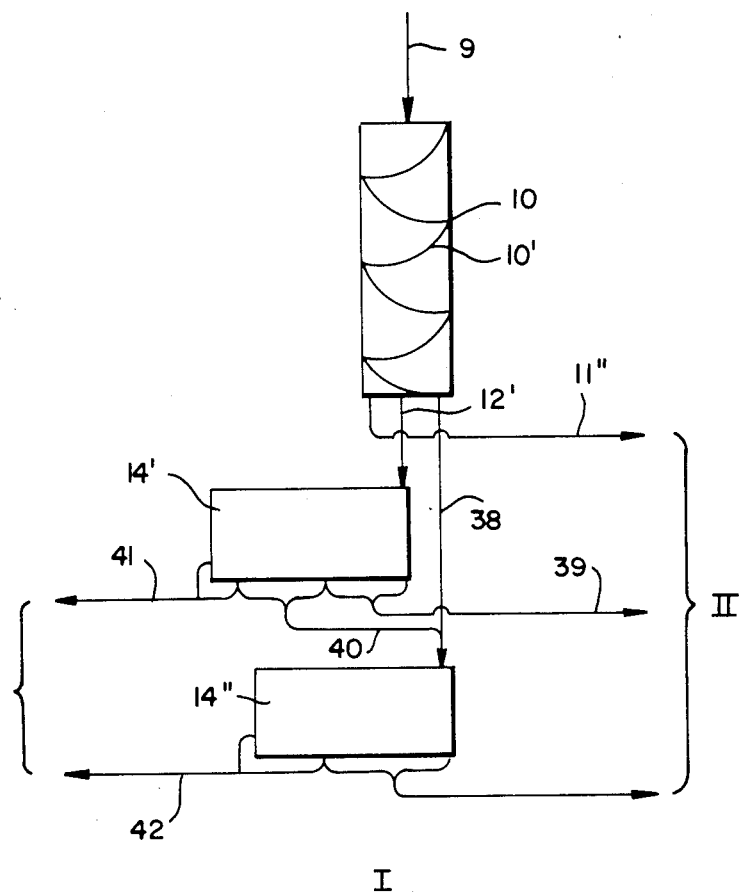
FIG. 2 shows in a partial view a particular embodiment of the vibrating table and its feed and discharge lines.

FIG. 2 shows a further embodiment according to the invention using a two-stage vibrating table. The lighter parts exiting from the spiral separator according to 11" are moved directly into Section II. The medium heavy parts, which include the metallic components, are conveyed according to 12' to the first stage 14' of the vibrating table, while the heavier components of the output of the spiral separator are transported according to 38 to the second stage 14" of the vibrating table while bypassing the first stage 14'. The first stage supplies at its outlet side 39 the lighter precipitated substances to Section II and at 40 the medium heavy substances to the second stage vibrating table 14", while the heavy and thus highly concentrated metallic output of the first stage 14' is discharged at 41. Stream 42 designates the outlet for the heavy and, therefore, highly concentrated metal output of the second stage vibrating table 14" and 41 and 42 thus represent the highly concentrated metal fraction obtained as the output of the two stage vibrating table arrangement.

The process and apparatus according to the invention, therefore, solve both the highly complex problem of the recovery of cable scrap and the recovery of valuable metals from electronic scrap, in particular the filter dust obtained in the process. The different modes of operation of the process stages described make it possible to separate the most diverse waste materials, which differe from each other on the one hand by their particle size and particle density, and on the other, by the form and composition of the particles (for example, cylindrical copper particles, tubular synthetic plastic sleeves, fibrous additives). The process stages described and represented may be applied together or—as explained hereinabove—in parts only. By means of combinations adjusted to the product and the prevailing conditions, the process and apparatus of the invention may be adapted to achieve particular results for given waste materials. The combination of spiral separators with vibrating tables (single or dual stage) desribed is found to be extremely economical, as the processing of cable scrap without spiral separators would require at least twice the number of vibrating tables in order to bring out the individual fractions, in particular the metal fraction, with an equal purity. The invention would be applicable to further uses involving the same or similar problems.

While the present invention has now been described in terms of certain preferred embodiments, one skilled in the art will readily appreciate that varios modifications, changes, omissions and substitutions may be made without departing from the spirt thereof. It is intended, therefore, that the present invention be limited solely by the scope of the following claims.

What is claimed is:

1. A process for separating metallic components from nonmetallic components in a mixture comprising mixing the mixture with water and subjecting the mixture to prefractionation by sedimentation to produce a heavy output fraction substantially comprising water, metallic components and heavy nonmetallic components and a light output fraction substantially comprising water, light nonmetallic components and entrained fibers and subsequently subjecting the heavy output fraction to laminar flow stratification fractionation to produce a heavy output fraction substantially comprising metallic components and a light output fraction substantially comprising nonmetallic components.

2. The process of claim 1, wherein said sedimentation is centrifugal sedimenation.

3. The process of claim 2, wherein said centrifugal sedimentation is performed by a hydrocyclone.

4. The process of claim 1, wherein the said light output fraction from said sedimentation is dried and subjected to a vertical current of air sufficient to remove entrained fibers.

5. The process of claim 1, wherein said heavy output fraction from said sedimentation is subjected to a plurality of sequential laminar flow stratification fractionations.

6. The process of claim 1, wherein the nonmetallic components of the light output fraction from said laminar flow stratification fractionation comprises synthetic resin materials, rubber materials and elastomeric materials.

7. The process of claim 6, wherein said light output fraction from said laminar flow stratification fractionation is subjected to a thermal pretreatment and further separated by impingement against baffle means according to elasticity.

8. An apparatus for separating metallic components from nonmetallic components in a mixture, comprising agitator means including a water inlet, agitator, means for addition of a mixture of metallic and nonmetallic components and outlet means, hydrocyclone having an inlet for receiving said mixture connected to the outlet means of said agitator means and an outlet for removal of a light output fraction substantially comprising light nonmetallic components and entrained fibers including light fibers, and an outlet for removal of a heavy output fraction substantially comprising metallic components and heavy nonmetallic components, said outlet for said heavy output fraction being connected to the inlet of a helical trough stratification separator which has at least two outlet means, at least one outlet means of said helical trough connected directly to inlet means of at least one vibrating table, said at least one vibrating table providing a heavy output fraction substantially comprising metallic components through outlet means on said vibrating table.

9. The apparatus of claim 8, wherein said at least one vibrating table comprises two vibrating tables connected in sequence.

10. The apparatus of claim 9, wherein said helical trough separator contains an outlet means for a medium heavy fraction connected to the inlet means of a first vibrating table, an outlet means for a heavy fraction connected to the inlet of a second vibrating table and an outlet means for a light fraction connected to dehydrating means.

11. The apparatus of claim 10, wherein said dehydration means is connected to particle separation means for separating different particles of the dehydrated light output.

12. The apparatus of claim 11, wherein said particle separation means comprises a blower for expelling the mixture of particles contained in said dehydrated light output under pressure and a baffle wall located at a variable angle with respect to the blower and a plurality of collector containers placed below the baffle wall at different distances therefrom for collecting particles having the same elastomeric characteristics.

13. The apparatus of claim 8 wherein said hydrocyclone contains an outlet for a light fraction which is connected to a fluid bed dryer and means for generating a vertical current of air sufficient for separating light fibers from slightly heavier synthetic substances.

14. The apparatus of claim 13, wherein said means to generate said vertical current of air comprises an air cyclone and blower for entraining the fibers in an upwardly moving air stream.

* * * * *